(12) United States Patent
Yamada et al.

(10) Patent No.: US 10,219,226 B2
(45) Date of Patent: Feb. 26, 2019

(54) BASE STATION APPARATUS, TERMINAL APPARATUS, AND COMMUNICATION METHOD

(71) Applicant: SHARP KABUSHIKI KAISHA, Sakai, Osaka (JP)

(72) Inventors: Ryota Yamada, Sakai (JP); Hiromichi Tomeba, Sakai (JP); Katsuya Kato, Sakai (JP); Jungo Goto, Sakai (JP); Osamu Nakamura, Sakai (JP); Tomoki Yoshimura, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/550,375

(22) PCT Filed: Jan. 29, 2016

(86) PCT No.: PCT/JP2016/052798
§ 371 (c)(1),
(2) Date: Aug. 11, 2017

(87) PCT Pub. No.: WO2016/129424
PCT Pub. Date: Aug. 18, 2016

(65) Prior Publication Data
US 2018/0035386 A1 Feb. 1, 2018

(30) Foreign Application Priority Data
Feb. 13, 2015 (JP) .................................. 2015-025902

(51) Int. Cl.
H04B 7/00 (2006.01)
H04W 52/22 (2009.01)
(Continued)

(52) U.S. Cl.
CPC .......... *H04W 52/228* (2013.01); *H04J 11/00* (2013.01); *H04J 11/004* (2013.01); *H04J 15/00* (2013.01);
(Continued)

(58) Field of Classification Search
CPC . H04W 52/228; H04W 76/27; H04W 52/243; H04W 52/50
See application file for complete search history.

(56) References Cited

U.S. PATENT DOCUMENTS

2011/0183673 A1* 7/2011 Kishiyama ............. H04B 7/022
455/436
2012/0201159 A1* 8/2012 Morita ................ H04W 72/082
370/252
(Continued)

OTHER PUBLICATIONS

"New Study Item Proposal: Enhanced Multiuser Transmissions and Network Assisted Interference Cancellation for LTE" 3GPP TSG RAN Meeting #66 Maui, USA, Dec. 8-11, 2014 RP-142315.

Primary Examiner — Md K Talukder
(74) Attorney, Agent, or Firm — ScienBiziP, P.C.

(57) ABSTRACT

A reduction in interference improves throughput and increase opportunity for communication by each terminal apparatus. A base station apparatus that communicates with a terminal apparatus transmits information relating to a transmit power for a UE-specific reference signal in a state of being included in downlink control information, in a case of a predetermined transmission mode. A terminal apparatus that communicates with a base station apparatus includes a reception unit that receives downlink control information which includes information relating to a transmit power for a UE-specific reference signal, from the base station apparatus, in a case of a predetermined transmission mode, and a reception signal is demodulated based on the downlink control information.

3 Claims, 4 Drawing Sheets

(51) Int. Cl.

| | |
|---|---|
| *H04J 11/00* | (2006.01) |
| *H04W 76/27* | (2018.01) |
| *H04W 52/24* | (2009.01) |
| *H04W 52/50* | (2009.01) |
| *H04J 99/00* | (2009.01) |
| *H04L 5/00* | (2006.01) |
| *H04W 52/34* | (2009.01) |
| *H04W 52/54* | (2009.01) |
| *H04W 52/14* | (2009.01) |
| *H04W 72/04* | (2009.01) |
| *H04W 72/12* | (2009.01) |

(52) U.S. Cl.
CPC ......... *H04L 5/0092* (2013.01); *H04W 52/243* (2013.01); *H04W 52/346* (2013.01); *H04W 52/50* (2013.01); *H04W 52/54* (2013.01); *H04W 76/27* (2018.02); *H04L 5/0037* (2013.01); *H04W 52/143* (2013.01); *H04W 72/042* (2013.01); *H04W 72/0473* (2013.01); *H04W 72/1289* (2013.01)

(56) References Cited

U.S. PATENT DOCUMENTS

| | | | |
|---|---|---|---|
| 2012/0314637 A1* | 12/2012 | Kim | H04L 1/1851 370/311 |
| 2013/0194940 A1* | 8/2013 | Li | H04J 11/0023 370/252 |
| 2014/0079052 A1* | 3/2014 | Senoo | H04W 56/00 370/350 |
| 2015/0382222 A1* | 12/2015 | Park | H04L 1/00 370/252 |
| 2016/0037579 A1* | 2/2016 | Jung | H04W 24/04 370/252 |
| 2016/0044644 A1* | 2/2016 | Lyu | H04L 5/0092 370/329 |
| 2018/0035386 A1* | 2/2018 | Yamada | H04J 11/00 |

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In communication systems such as Long Term Evolution (LTE) and LTE-Advanced (LTE-A) which have been developed by Third Generation Partnership Project (3GPP), a cellular constitution is employed in which a plurality of areas, each of which is covered by a base station apparatus (a base station, a transmission station, a transmission point, a downlink transmission apparatus, an uplink reception apparatus, a transmit antenna group, a transmit antenna port group, a component carrier, or an eNodeB), or by a transmission station that is equivalent to the base station apparatus, are arranged in cells, and thus a communication area can be enlarged. In such cellular constitution, if the same frequency is used between neighboring cells or sectors, frequency efficiency can be improved.

In recent years, techniques with which a plurality of terminal apparatuses are non-orthogonally multiplexed for communication by allocating the same time, frequency, and spatial resource have been studied in order to increase a system capacity or create more opportunity for communication. Because the base station apparatus performs transmission while a plurality of terminal apparatuses are non-orthogonally multiplexed, interference between users occurs. Therefore, it is desirable that the terminal apparatus cancels inter-user interference. Codeword Level Interference Cancellation (CWIC) in which interference is cancelled after an interference signal is decoded is an example of the technique with which the inter-user interference is canceled. Such techniques are described above are described in NPL 1.

CITATION LIST

Non Patent Literature

NPL 1: "Enhanced Multiuser Transmission and Network Assisted Interference Cancellation", 3GPP TSG RAN Meeting #66, December 2014

SUMMARY OF INVENTION

Technical Problem

However, in order to implement an interference cancellation technique, such as CWIC, in a terminal apparatus, it is desirable that the terminal apparatus knows information relating to an interference signal, such as a parameter for demodulating or decoding the interference signal.

An object of the present invention, which was made in view of such situation, is to provide a base station apparatus, a terminal apparatus, and a communication method, in all of which a reduction in interference makes it possible to improve throughput and to increase opportunity for communication by each terminal apparatus.

Solution to Problem

In order to deal with the problem described above, the following constitutions of a base station apparatus, a terminal apparatus, and a communication method according to the present invention are provided.

A base station apparatus according to the present invention is a base station apparatus that communicates with a terminal apparatus and includes a transmission unit that transmits information relating to a transmit power for a UE-specific reference signal in a state of being included in downlink control information, in a case of a predetermined transmission mode.

Furthermore, in the base station apparatus according to the present invention, the information relating to the transmit power for the UE-specific reference signal is a power offset between the transmit power for the UE-specific reference signal and a transmit power for a downlink shared channel.

Furthermore, in the base station apparatus according to the present invention, in the case of the predetermined transmission mode, a plurality of terminal apparatuses are multiplexed for transmission, based on the information relating to the transmit power, using the same time or frequency resource and the same antenna port.

Furthermore, a terminal apparatus according to the present invention is a terminal apparatus that communicates with a base station apparatus and includes a reception unit that receives downlink control information which includes information relating to a transmit power for a UE-specific reference signal, from the base station apparatus, in a case of a predetermined transmission mode, in which a reception signal is demodulated based on the downlink control information.

Furthermore in the terminal apparatus according to the present invention, the information relating to the transmit power for the UE-specific reference signal is a power offset between the transmit power for the UE-specific reference signal and a transmit power for a downlink shared channel.

Furthermore, in the terminal apparatus according to the present invention, in the case of the predetermined transmission mode, an interference signal and a signal that is transmitted to the terminal apparatus itself are regarded as being transmitted with the same antenna port, and the interference signal is cancelled or suppressed.

Furthermore, a communication method according to the present invention is a communication method for use in a base station apparatus that communicates with a terminal apparatus, the method including a transmission step of transmitting information relating to a transmit power for a UE-specific reference signal in a state of being included in downlink control information, in a case of a predetermined transmission mode.

Furthermore, a communication method according to the present invention is a communication method for use in a terminal apparatus that communicates with a base station apparatus, the method including a reception step of receiving downlink control information which includes information relating to a transmit power for a UE-specific reference signal, from the base station apparatus, in a case of a predetermined transmission mode, in which an interference signal is cancelled or suppressed based on the downlink control information.

Advantageous Effects of Invention

According to the present invention, an interference signal can be reduced. Thus, throughput can be improved or opportunity for communication by a terminal apparatus can be increased.

DESCRIPTION OF EMBODIMENTS

A communication system according to the present embodiment includes a base station apparatus (a transmission apparatus, a cell, a transmission point, a transmit antenna group, a transmit antenna port group, a component carrier, or an eNodeB) and a terminal apparatus (a terminal, a mobile terminal, a reception point, a reception terminal, a reception apparatus, a receive antenna group, a receive antenna port group or a UE).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
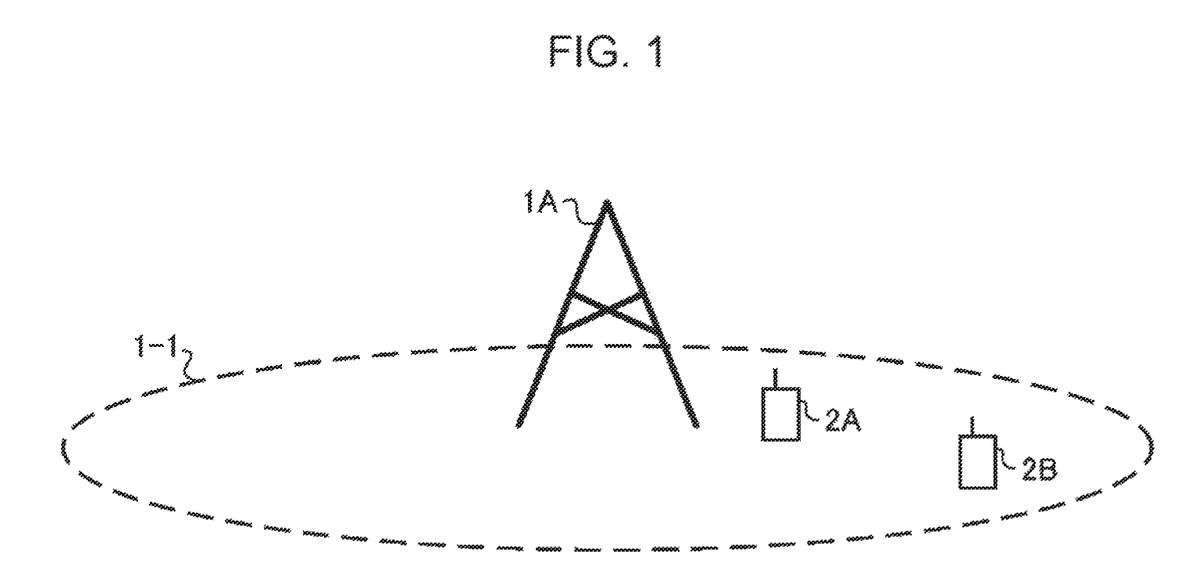
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Furthermore, coverage 1-1 is a range (a communication area) in which it is possible that the base station apparatus 1A connects to the terminal apparatus. Furthermore, the terminal apparatuses 2A and 2B are collectively also referred to as a terminal apparatus 2.

In FIG. 1, in uplink wireless communication from the terminal apparatus 2A to the base station apparatus 1A, the following uplink physical channels are used. The uplink physical channels are used to transmit information that is output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). At this point, the Uplink Control Information includes a positive acknowledgement (ACK) or a negative acknowledgement (NACK) (ACK or NACK) of downlink data (a downlink transport block or a Downlink-Shared Channel (DL-SCH)). The ACK or NACK of the downlink data is also referred to as an HARQ-ACK or HARQ feedback.

Furthermore, the Uplink Control Information includes Channel State Information (CSI) for downlink. Furthermore, the Uplink Control Information includes a Scheduling Request (SR) that is used to make a request for a resource for an Uplink-Shared Channel (UL-SCH). A Rank Indicator (RI) indicating the suitable number of spatial multiplexes, a Precoding Matrix Indicator (PMI) indicating a suitable precoder, a Channel Quality Indicator (CQI) indicating a suitable transmission rate, and the like correspond to the Channel State Information.

The Channel Quality Indicator (CQI) (which is hereinafter referred to as a CQI value) can be assumed to be a suitable modulation scheme (for example, QPSK, 16 QAM, 64 QAM, 256 QAM, or the like) in a predetermined band (which will be described in detail below) and a coding rate. The CQI value can be assumed to be an index (a CQI Index) that is determined with the change scheme and the coding rate. The CQI value can also be assumed to be determined in advance in the system.

It is noted that the Rank Indicator and the Precoding Quality Indicator can be assumed to be determined in advance in the system. The Rank Indicator or the Precoding Matrix Indicator can be assumed to be an index that is determined in advance with the number of spatial multiplexes or the Precoding Matrix information. It is noted that values of the Rank Indicator, the Precoding Matrix Indicator, and the Channel Quality Indicator (CQI) are collectively referred to as a CSI value.

The PUSCH is used to transmit uplink data (an uplink transport block or the UL-SCH). Furthermore, the PUSCH may be used to transmit the ACK or NACK and/or the Channel State Information, along with the uplink data. Furthermore, the PUSCH may be used to transmit only the Uplink Control Information.

Furthermore, the PUSCH is used to transmit an RRC message. The RRC message is information or a signal that is processed in a Radio Resource Control (RRC) layer. Furthermore, the PUSCH is used to transmit a MAC Control Element (CE). At this point, the MAC CE is information or a signal that is processed (transmitted) in a Medium Access Control (MAC) layer.

For example, a power headroom may be included in the MAC CE and may be reported through the PUSCH. That is, a MAC CE field may be used to indicate a power headroom level.

The PRACH is used to transmit a random access preamble.

Furthermore, in the uplink wireless communication, an Uplink Reference Signal (UL RS) is used as an uplink physical signal. The uplink physical signal is not used to transmit the information that is output from the higher layer, but is used by a physical layer. At this point, a Demodulation Reference Signal (DMRS) and a Sounding Reference Signal (SRS) are included in the Uplink Reference Signal.

The DMRS is associated with transmission of the PUSCH or the PUCCH. For example, the base station apparatus 1A uses the DMRS to perform channel reconfiguration of the PUSCH or the PUCCH. The SRS is not associated with the transmission of the PUSCH or the PUCCH. For example, the base station apparatus 1A uses the SRS to measure an uplink channel state.

In FIG. 1, in downlink wireless communication from the base station apparatus 1A to the terminal apparatus 2A, the following downlink physical channels are used. The downlink physical channels are used to transmit the information that is output from the higher layer.

Physical Broadcast Channel (PBCH) (Broadcast Channel)
Physical Control Format Indicator Channel (PCFICH) (Control Format Indicator Channel)
Physical Hybrid automatic repeat request Indicator Channel (PHICH) (HARQ Indicator Channel)
Physical Downlink Control Channel (PDCCH) (Downlink Control Channel)
Enhanced Physical Downlink Control Channel (EPDCCH) (Enhanced Downlink Control Channel)
Physical Downlink Shared Channel (PDSCH) (Downlink Shared Channel).

The PBCH is used to broadcast a Master Information Block (MIB) (Broadcast Channel (BCH)) that is used in a shared manner in the terminal apparatus. The PCFICH is used to transmit information indicating a region (for example, the number of OFDM symbols) that is used for transmission of the PDCCH.

The PHICH is used to transmit an ACK or NACK of the uplink data (a transport block or a codeword) that is received by the base station apparatus 1A. That is, the PHICH is used to transmit an HARQ indicator (HARQ feedback) indicating the ACK or NACK of the uplink data. Furthermore, the ACK or NACK is also referred to as an HARQ-ACK. The terminal apparatus 2A notifies the higher layer of the received ACK or NACK. The ACK is an ACK indicating that reception is correctly performed. The NACK is a NACK indicating that reception is not correctly performed and is DTX indicating that corresponding data is not present. Furthermore, in a case where the PHICH for the uplink data is not present, the terminal apparatus 2A notifies the higher layer of the ACK.

The PDCCH and the EPDCCH are used to transmit Downlink Control Information (DCI). At this point, a plurality of DCI formats are defined for transmission of the Downlink Control Information. That is, a field for the Downlink Control Information is defined in a DCI format and is mapped to an information bit.

For example, DCI format 1A that is used for scheduling of one PDSCH (transmission of one downlink transport block) in one cell is defined as a DCI format for the downlink.

For example, information relating to PDSCH resource allocation, information relating to a Modulation and Coding Scheme (MCS) for the PDSCH, and the Downlink Control Information such as a TPC command for the PUCCH are included in the DCI format for the downlink. At this point, the DCI format for the downlink is also referred to as a downlink grant (or a downlink assignment).

Furthermore, for example, DCI format 0 that is used for scheduling of one PUSCH (transmission of one uplink transport block) in one cell is defined as a DCI format for uplink.

For example, information relating to PUSCH resource allocation, information relating to an MCS for the PUSCH, and Uplink Control Information such as a TPC command for the PUSCH are included in the DCI format for the uplink. The DCI format for the uplink is also referred to as an uplink grant (or an uplink assignment).

Furthermore, the DCI format for the uplink can be used to make a request (a CSI request) for the Channel State Information (CSI) (which is also referred to as received-quality information) for the downlink. The Rank Indicator (RI) indicating the suitable number of spatial multiplexes, the Precoding Matrix Indicator (PMI) indicating a suitable precoder, the Channel Quality Indicator (CQI) indicating a suitable transmission rate, a Precoding type Indicator (PTI) and the like correspond to the Channel State Information.

Furthermore, the DCI format for the uplink can be used for a configuration indicating an uplink resource to which a channel state information report (CSI feedback report) that is fed back by the terminal apparatus to the base station apparatus is mapped. For example, the channel state information report can be used for a configuration indicating an uplink resource in which Channel State Information (Periodic CSI) is periodically reported. The channel state information report can be used for a mode configuration (CSI report mode) in which the Channel State Information is periodically reported.

For example, the channel state information report can be used for a configuration indicating an uplink resource in which aperiodic Channel State Information (Aperiodic CSI) is reported. The channel state information report can be used for the mode configuration (the CSI report mode) in which the Channel State Information is aperiodically reported. The base station apparatus can configure either the periodic channel state information report or the aperiodic channel state information report. Furthermore, the base station apparatus can also configure both of the periodic channel state information report and the aperiodic channel state information report.

Furthermore, the DCI format for the uplink can be used for a configuration indicating a type of channel state information report that is fed back by the terminal apparatus to the base station apparatus. As types of channel state information reports, there are broadband CSI (for example, Wideband CQI), narrowband CSI (for example, Subband CQI), and the like.

In a case where a PDSCH resource is scheduled using the downlink assignment, the terminal apparatus receives the downlink data, on the scheduled PDSCH. Furthermore, in a case where a PUSCH resource is scheduled using the uplink grant, the terminal apparatus transmits the uplink data and/or the Uplink Control Information, on the scheduled PUSCH.

The PDSCH is used to transmit the downlink data (the downlink transport block or the DL-SCH). Furthermore, the PDSCH is used to transmit a system information block type-1 message. The system information block type-1 message is cell-specific (cell-peculiar) information.

Furthermore, the PDSCH is used to transmit a system information message. The system information message includes a system information block X other than the system information block type-1. The system information message is cell-specific (cell-peculiar) information.

Furthermore, the PDSCH is used to transmit the RRC message. At this point, the RRC message that is transmitted from the base station apparatus may be common to a plurality of terminal apparatuses within a cell. Furthermore, the RRC message that is transmitted from the base station apparatus 1A may be a message (which is also referred to as dedicated signaling) dedicated to a certain terminal apparatus 2. That is, UE-specific (UE-peculiar) information is transmitted using a message dedicated to a certain terminal apparatus. Furthermore, the PDSCH is used to transmit the MAC CE.

At this point, the RRC message and/or the MAC CE are also referred to as higher layer signaling.

Furthermore, the PDSCH can be used to make a request for the Channel State information for the downlink. Furthermore, the PDSCH can be used to transmit the uplink resource to which the channel state information report (the CSI feedback report) that is fed back by the terminal apparatus to the base station apparatus is mapped. For example, the channel state information report can be used for the configuration indicating the uplink resource in which the Channel State Information (the Periodic CSI) is periodically reported. The channel state information report can be used for the mode configuration (the CSI report mode) in which the Channel State Information is periodically reported.

As types of channel state information reports for the downlink, there are broadband CSI (for example, Wideband CSI), narrowband CSI (for example, Subband CSI), and the like. The broadband CSI results from calculating one piece of Channel State Information for a cell system band. The narrowband CSI results from dividing a system band by a predetermined unit into smaller ones and calculating one piece of Channel State Information for each of the smaller ones that results from the division.

Furthermore, in the downlink wireless communication, a synchronization signal (SS) and a Downlink Reference Signal (DL RS) are used as downlink physical signals. The downlink physical signal is not used to transmit the information that is output from the higher layer, but is used by the physical layer.

The synchronization signal is used for the terminal apparatus to be synchronized to a frequency domain for and a time domain for the downlink. Furthermore, the Downlink Reference Signal is used for the terminal apparatus to perform the channel reconfiguration of the downlink physical channel. For example, the Downlink Reference Signal is used for the terminal apparatus to calculate the Channel State Information for the downlink.

At this point, a Cell-specific Reference Signal (CRS), a UE-specific Reference Signal (URS) (Terminal-specific Reference Signal) associated with the PDSCH, a Demodulation Reference Signal (DMRS) associated with the EPDCCH, a Non-Zero Power Channel State Information-Reference Signal (NZP CSI-RS), and a Zero Power Channel State Information-Reference Signal (ZP CSI-RS) are included in the Downlink Reference Signal.

The CRS is transmitted in all bands in a subframe, and is used for performing demodulation of the PBCH/PDCCH/PHICH/PCFICH/PDSCH. The URS associated with the PDSCH is transmitted in a subframe and a band that are used for transmission of the PDSCH with which the URS is associated, and is used for performing the demodulation of the PDSCH with which the URS is associated.

The DMRS that is associated with the EPDCCH is transmitted in a subframe and a band that are used for transmission of the EPDCCH with which the DMRS is associated. The DMRS is used to perform demodulation of the EPDCCH with which the DMRS is associated.

A resource for the NZP CSI-RS is configured by the base station apparatus 1A. For example, the terminal apparatus 2A performs signal measurement (channel measurement) using the NZP CSI-RS. A resource for the ZP CSI-RS is configured by the base station apparatus 1A. With a zero output, the base station apparatus 1A transmits the ZP CSI-RS. For example, the terminal apparatus 2A performs interference measurement on a resource to which the NZP CSI-RS corresponds.

A Multimedia Broadcast multicast service Single Frequency Network (MBSFN) RS is transmitted in all bands in a subframe that is used for transmission of a PMCH. The MBSFN RS is used to perform demodulation of the PMCH. The PMCH is transmitted in an antenna port that is used for transmission of the MBSFN RS.

At this point, the downlink physical channel and the downlink physical signal are also collectively referred to as a downlink signal. Furthermore, the uplink physical channel and the uplink physical signal are also collectively referred to as an uplink signal. Furthermore, the downlink physical channel and the uplink physical channel are also collectively referred to as a physical channel. Furthermore, the downlink physical signal and the uplink physical signal are also collectively referred to as a physical signal.

Furthermore, the BCH, the UL-SCH, and the DL-SCH are transport channels. A channel that is used in the MAC layer is referred to as a transport channel. Furthermore, a unit of a transport channel that is used in the MAC layer is also referred to as a Transport Block (TB) or a MAC Protocol Data Unit (PDU). The Transport Block is a unit of data that is delivered by the MAC layer to the physical layer. In the physical layer, the Transport Block is mapped to a codeword, and coding processing and the like are performed on every codeword.

The base station apparatus can multiplex a plurality of terminal apparatuses without dividing a resource that is a time, a frequency and a space (for example, an antenna port, a beam pattern, and a precoding pattern). Multiplexing of a plurality of terminal apparatuses without dividing time, frequency, and space resources is hereinafter referred to as non-orthogonal multiplexing. A case where two terminal apparatuses are non-orthogonally multiplexed will be described below, but without the present invention being limited to this, it is also possible that three or more terminal apparatuses are non-orthogonally multiplexed.

The base station apparatus can transmit a common UE-specific Reference Signal to a plurality of terminal apparatuses that are non-orthogonally multiplexed. More precisely, the base station apparatus can transmit a reference signal to a plurality of terminal apparatuses, using the same resource and the same reference signal sequence in the time, the frequency, and the space.

A case where the base station apparatus 1A in FIG. 1 non-orthogonally multiplexes the terminal apparatus 2A and the terminal apparatus 2B is described as an example. The base station apparatus 1A can allocate different transmit powers to a transmit signal that is transmitted to the terminal apparatus 2A and a transmit signal that is transmitted to the terminal apparatus 2B, for transmission. For example, in the following description, a case where a power for transmission of the PDSCH to the terminal apparatus 2B is higher than a power for transmission of the PDSCH to the terminal apparatus 2A is described. The PDSCH to the terminal apparatus 2A and the PDSCH to the terminal apparatus 2B are also referred to PDSCH 1 (a first PDSCH) and PDSCH 2 (a second PDSCH), respectively. Furthermore, the base station apparatus 1A transmits the common UE-specific Reference Signal to the terminal apparatus 2A and the terminal apparatus 2B. Furthermore, the base station apparatus 1A can set a transmit power for the common UE-specific Reference Signal to be a transmit power suitable for demodulation of PDSCH 2 by the terminal apparatus 2B. For example, the base station apparatus 1A can allocate the same transmit power to the common UE-specific Reference Signal and PDSCH 2 for transmission. Alternatively, the base station apparatus 1A can allocate a total transmit power for PDSCH 1 and PDSCH 2, that is, a sum of a transmit power for PDSCH 1 and a transmit power for PDSCH 2, for the transmit power for the common UE-specific Reference Signal.

Figure 2:
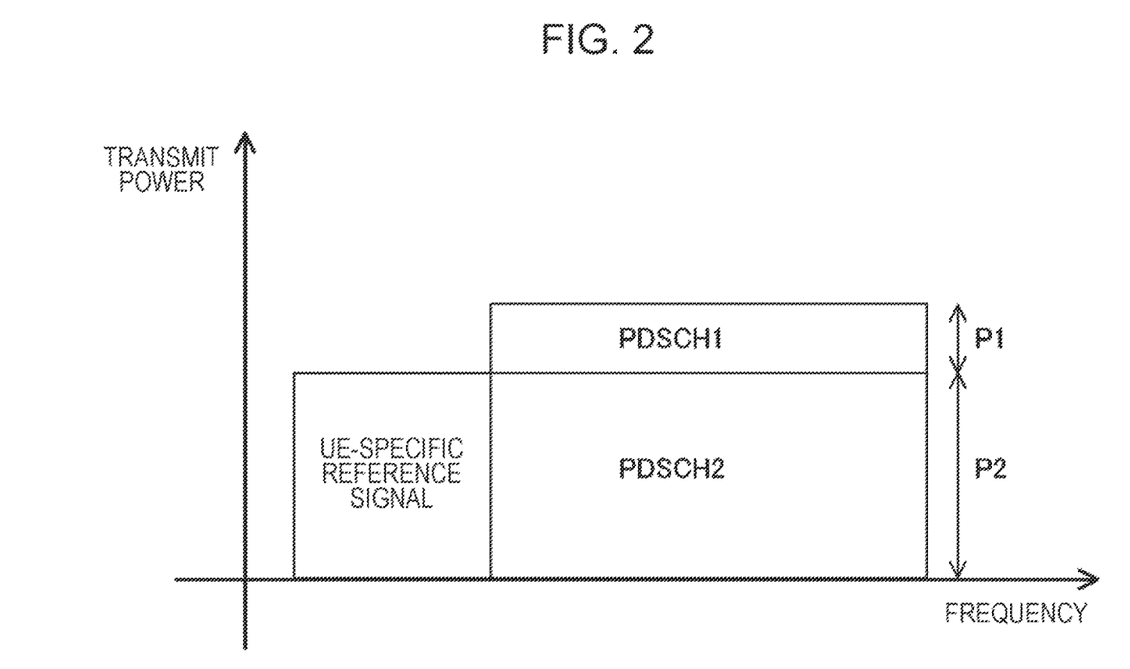
FIG. 2 is a diagram illustrating an example of power allocation for a transmit signal according to the present embodiment.

For example, as illustrated in FIG. 2, the base station apparatus 1A can transmit PDSCH 1 and/or PDSCH 2. It is noted that in FIG. 2, a case where the frequencies for PDSCH 1 and PDSCH 2 overlap completely is illustrated, but without the present invention being limited to this, any partial overlapping of allocations of PDSCH 1 and PDSCH 2 is included in the present invention. P1 and P2 that are illustrated in FIG. 2 indicate the transmit power for PDSCH 1 and the transmit power for PDSCH 2, respectively. Because the base station apparatus transmits PDSCH 1 and PDSCH 2 in a state of being non-orthogonally multiplexed onto each other, a total transmit power is P1+P2. In FIG. 2, a case where a transmit power for the UE-specific Reference Signal is P2 is illustrated, but the transmit power can be set to be P1+P2, or can be set to be somewhere between P2 and P1+P2.

In a case where the base station apparatus transmits a signal that is transmitted to a plurality of terminal apparatuses, in a state of being non-orthogonally multiplexed onto each other, PDSCH 1 and PDSCH 2 cause interference to each other. In this case, because an interference power is higher than a power for a signal that is transmitted to the terminal apparatus 2A itself, it is at least desirable that the terminal apparatus 2A handles, cancels, or suppresses an interference signal. This interference signal is referred to as multiuser interference, inter-user interference, multiuser transmission-caused interference, co-channel interference or the like. In order to cancel or suppress the interference signal, for example, an interference signal replica signal that is obtained from demodulation of the interference signal or a result of the demodulation is subtracted from a reception signal. For the cancellation or suppress of the interference signal, there are Symbol Level Interference Cancellation (SLIC) that performs interference cancellation according to a result of the demodulation of the interference signal, Codeword Level Interference Cancellation (CWIC) that performs the interference cancellation according to a result of the decoding of the interference signal, Maximum Likelihood Detection (MLD) that searches for the most similar one, among transmission signal candidates, and the like.

With reception from the base station apparatus or blind detection, the terminal apparatus 2A can detect a parameter necessary for cancellation or suppression of the interference signal. The cancellation or suppression of the interference signal is not necessarily required for the terminal apparatus 2B. In a case where the terminal apparatus 2B does not perform interference cancellation, because an interference signal power is comparatively low, the terminal apparatus 2B, although not knowing a parameter relating to the interference signal, can demodulate a signal that is transmitted to the terminal apparatus itself. More precisely, in a case where the base station apparatus 1A non-orthogonally multiplexes the terminal apparatuses 2A and 2B, it is desirable that the terminal apparatus 2A is provided with a function of removing or suppressing the interference signal by performing the non-orthogonal multiplexing, but the terminal apparatus 2B may be provided without a function of performing the interference cancellation or suppression. In other words, the base station apparatus 1A can non-orthogonally multiplex a terminal apparatus that supports the non-orthogonal multiplexing and a terminal apparatus that does not support the non-orthogonal multiplexing. Furthermore, in other words, the base station apparatus 1A can non-orthogonally multiplex terminal apparatuses for which different transmission modes are configured. Therefore, more opportunity for communication by each terminal apparatus can be created.

The base station apparatus 1A transmits information (assist information, supplementary information, control information, or configuration information) relating to a terminal apparatus (which, in this example, is the terminal apparatus 2B) that causes interference, to the terminal apparatus 2A. With the higher layer signaling or a physical layer signal (a control signal) (the PDCCH or the EPDCCH), the base station apparatus 1A can transmit the information (Network Assisted Interference Cancellation and Suppression (NAICS) information, NAICS assist information, NAICS configuration information, Multiuser (MU)-NAICS information, MU-NAICS assist information, MU-NAICS configuration information, Non Orthogonal Multiple Access (NOMA) information, NOMA assist information, and NOMA configuration information) relating to the terminal apparatus that causes the interference.

Included in the MU-NAICS assist information is part or all of information relating to PA, a transmission mode, information relating to a transmit power for the UE-specific Reference Signal, information relating to a transmit power for the PDSCH that causes the interference signal, a PMI, information relating to the PA in a serving cell, information relating to the transmit power for the UE-specific Reference Signal in the serving cell, a modulation scheme, a Modulation and Coding Scheme (MCS), a redundancy version, a Radio Network Temporary Identifier (RNTI), and information relating to the transmission mode.

It is noted that the PA is a transmit power ratio (a power offset) between the PDSCH and the CRS in an OFDM symbol to which the CRS is not mapped. Information relating to the transmit power for the UE-specific Reference Signal, for example, indicates a power ratio (a power offset) between the transmit power for the UE-specific Reference Signal and a PDSCH transmit power. Information relating to the transmit power for the PDSCH that causes the interference signal, for example, is the transmit power (P2 in the example in FIG. 2) for the PDSCH that causes the interference signal, or a power ratio (P2/P1 or P1/P2 in an example in FIG. 2, in which, notably, "/" is used here to mean division) between transmit powers for the interference signal and the PDSCH for the terminal apparatus itself. In a case of the transmit power for the UE-specific Reference Signal is P2, with the power ratio between the transmit power for the UE-specific Reference Signal and the transmit power for the PDSCH, the terminal apparatus can obtain the power ratio between the transmit powers for the interference signal and the PDSCH for the terminal apparatus itself.

Furthermore, the information relating to the transmission mode is assist information for the terminal apparatus 2A to know (detect) a transmission mode for the interference signal, such as a transmission mode for the interference signal or a candidate for the transmission mode that can be configured (or is likely to be configured) by the base station apparatus 1A.

Furthermore, one value (candidate) or a plurality of values (candidates) may be configured as each of the parameters that are included in the MU-NAICS assist information described above. In a case where the plurality of values are configured, when it comes to the parameter, the terminal apparatus detects (blind-detects) a parameter that is configured to be in the interference signal, from the plurality of values. Furthermore, one or several of, or all of the parameters that are included in the MU-NAICS assist information described above are transmitted using the higher layer signaling. Furthermore, one or several of, or all of the parameters that are included in the MU-NAICS assist information described above are transmitted using the physical layer signal.

Furthermore, the MU-NAICS assist information may be used when various measurements are made. The measurements include a Radio Resource Management (RRM) measurement and a Channel State Information (CSI) measurement.

Furthermore, in a case where the terminal apparatus 2A supports Carrier Aggregation (CA), the base station apparatus 1A can configure the MU-NAICS assist information for a Primary Cell (PCell) and/or a Secondary Cell (SCell). Furthermore, the base station apparatus 1A can configure or transmit the MU-NAICS assist information for or to only the PCell.

The base station apparatus 1A can transmit at least the information relating to the transmit power for the Terminal-specific Reference Signal, among the parameters that are included in the MU-NAICS assist information, in a state of being included in the Downlink Control Information. It is noted that at this point, the Downlink Control Information that includes at least the information relating to the transmit power for the Terminal-specific Reference Signal is also referred to as first DCI, and the Downlink Control Information that does not include the information relating to the transmit power for the Terminal-specific Reference Signal is also referred to as second DCI. Furthermore, a DCI format that corresponds to the first DCI is referred to as a first DCI format, and a DCI format that corresponds to the second DCI is referred to as a second DCI format.

The base station apparatus 1A can transmit the first DCI to the terminal apparatus 2A, using the first DCI format, when in a predetermined transmission mode. Furthermore, in a case where the terminal apparatuses 2A and 2B are non-orthogonally multiplexed, the base station apparatus 1A can transmit the first DCI to the terminal apparatus 2A that performs the cancellation or suppression of the interference signal, and can transmit the second DCI to the terminal apparatus 2B. It is noted that the terminal apparatus 2A can cancel or suppress the interference signal, assuming that the terminal apparatus 2B is in a different transmission mode than the terminal apparatus 2A itself.

The terminal apparatus 2A receives the MU-NAICS assist information using the higher layer signaling and/or the physical layer signal. The terminal apparatus 2A detects (specified) a parameter for removing or suppressing the interference signal based on the MU-NAICS assist information, and cancels or suppresses the interference signal using the parameter. It is noted that the terminal apparatus 2A can detect a parameter that is not included in the MU-NAICS information, by performing the blind detection that attempts to detect parameter candidates in order.

The base station apparatus explicitly codes the RNTI into a Cyclic Redundancy Check (CRC) for the Downlink Control Information that is carried on the PDCCH/EPDCCH, for transmission. The terminal apparatus performs blind decoding that is based on the RNTI, on the PDCCH/EPDCCH for the terminal apparatus itself, and thus detects the Downlink Control Information. Furthermore, the base station apparatus performs scrambling that is based on the RNTI, on the PDSCH, and transmits the resulting PDSCH. It is desirable that the terminal apparatus performs descrambling that is based on the RNTI, when performing error correction decoding on the PDSCH.

In a case where the MU-NAICS assist information is transmitted or in a case of a predetermined transmission mode, the base station apparatus 1A can allocate two types of RNTIs to the terminal apparatus 2A. The two types of RNTIs are referred to as a first RNTI (for example, Cell RNTI) and a second RNTI, respectively. The base station apparatus 1A can include the second RNTI in the MU-NAICS assist information. The base station apparatus 1A can transmit the second RNTI using the higher layer signaling or the physical layer signal. The base station apparatus 1A can mask the Downlink Control Information with the first RNTI, and can scramble a codeword that is carried on the PDSCH, based on the second RNTI, for transmission. Furthermore, in a case where the terminal apparatuses 2A and 2B are non-orthogonally multiplexed, the base station apparatus 1A can scramble a signal (a codeword) on PDSCH 1 and a signal (a codeword) on PDSCH 2 based on the second RNTI with the same ID, for transmission. In a case where a predetermined transmission mode is configured, or in a case where the MU-NAICS information is received, the terminal apparatus 2A blind-decodes the Downlink Control Information based on the first RNTI, and performs the cancellation or suppression of the interference signal based on the second RNTI. Furthermore, the terminal apparatus 2A performs descrambling on the signal on the PDSCH for the terminal apparatus 2A itself, based on the second RNTI, and thus performs the error correction decoding. For example, in a case where the base station apparatus 1A configures a C-RNTI of the terminal apparatus 2B as a second RNTI of the terminal apparatus 2A, because it is not desirable that additional information is transmitted to the terminal apparatus 2B, an increase in an amount of control information can be suppressed.

In the case of a transmission mode other than the predetermined transmission mode, the base station apparatus 1A masks the Downlink Control Information with the first RNTI, and scrambles the codeword that is carried on the PDSCH, based on the first RNTI, for transmission. In the case of a transmission mode other than the predetermined transmission mode, the terminal apparatus 2A blind-decodes the Downlink Control Information based on the first RNTI, and descrambles the PDSCH based on the first RNTI.

There is a likelihood that the PDCCH will be allocated to various places (resources or resource elements). The terminal apparatus searches for all spaces in each of which there is a likelihood that the PDCCH will be allocated. A space in which there is a likelihood that the PDCCH will be allocated is referred to as a search space. As search spaces, there are a Common Search Space (CSS) that is a search space that is common all terminal apparatuses, and UE specific Search Space (USS) that is a search space that is specific to the terminal apparatus.

In the case of the predetermined transmission mode and/or in a case where the MU-NAICS assist information is configured, the base station apparatus 1A can use the first RNTI, if the Downlink Control Information is transmitted with the Common Search Space, and can use the second RNTI if the Downlink Control Information is transmitted with the UE specific Search Space. In a case where the predetermined transmission mode is configured, the terminal apparatus 2A can use the first RNTI if the Downlink Control Information is blind-decoded with the Common Search Space, and can use the second RNTI if the Downlink Control Information is blind-decoded with the UE specific Search Space. More precisely, in the case of the predetermined transmission mode or in a case where the MU-NAICS assist information is received, the terminal apparatus 2A does not perform the cancellation or suppression of the interference signal if the Downlink Control Information is received with the Common Search Space, and can perform the cancellation or suppression of the interference signal if the Downlink Control Information is received with the UE specific Search Space.

In the case of a transmission mode other than the predetermined transmission mode or in a case where the Downlink Control Information is transmitted with the Common Search Space, the base station apparatus 1A masks the Downlink Control Information based on the first RNTI and transmits the Downlink Control Information. In the case of the transmission mode other than the predetermined transmission mode or in a case where the Downlink Control Information is received with the Common Search Space, the terminal apparatus 2A can blind-decode the Downlink Control Information based on the first RNTI.

Furthermore, in the case of the predetermined transmission mode, the base station apparatus 1A can mask the Downlink Control Information in the second DCI format with the first RNTI, and can mask the Downlink Control Information in the second DCI format with the first RNTI. Furthermore, in the case of the predetermined transmission mode, the base station apparatus 1A can transmit the first DCI with the Common Search Space and the UE specific Search Space, and can transmit the second DCI with the UE specific Search Space. In the case of the predetermined transmission mode, the terminal apparatus 2A blind-decodes the first DCI format based on the second RNTI, and blind-decodes the second DCI format with the first RNTI. Furthermore, in the case of the predetermined transmission mode, the terminal apparatus 2A can receive the first DCI with the Common Search Space and the UE specific Search Space, and can receive the second DCI with the UE specific Search Space.

Furthermore, in the case of the predetermined transmission mode and in a case where the Downlink Control Information is transmitted with the UE specific Search Space, the base station apparatus 1A can mask the first DCI and the second DCI with the second RNTI with the same value. In other words, the terminal apparatus 2A can blind-decode the first DCI and the second DCI using the second RNTI that is configured or transmitted by the base station apparatus 1A. The terminal apparatus 2A, for example, can distinguish between the first DCI and the second DCI using the transmission mode for the interference signal or the DCI format. If the terminal apparatus 2A can know the second DCI, the number of parameters that are included in the MU-NAICS assist information can be decreased. Therefore, overhead due to the control information can be reduced, throughput can be improved.

Furthermore, in the case of the predetermined transmission mode, the base station apparatus 1A can transmit the Downlink Control Information that is common to a plurality of terminal apparatuses. The Downlink Control Information that is common to the plurality of terminal apparatuses is also referred to as third Downlink Control Information (third DCI). For example, the base station apparatus 1A can mask the third DCI with the second RNTI for transmission. Because a plurality of terminal apparatuses search for the same Downlink Control Information, the base station apparatus 1A can transmit the third DCI with the Common Search Space. In the case of the predetermined transmission mode, each terminal apparatus can blind-decode the third DCI based on the second RNTI with the Common Search Space. If the Downlink Control Information is shared among the plurality of terminal apparatuses, the overhead due to the control information can be reduced and the throughput can be improved.

Furthermore, in order to reduce the overhead due to the control information, the base station apparatus 1A can set resource allocation information that is included in the first DCI and the second DCI, to be shared. More precisely, in the case of the predetermined transmission mode, the base station apparatus 1A can non-orthogonally multiplex a plurality of terminal apparatuses with the same resource. In this case, the terminal apparatus 2A can demodulate PDSCH 1 for the terminal apparatus 2A itself, assuming that a signal (for example, PDSCH 2) for another terminal apparatus is non-orthogonally multiplexed onto all resource elements (a resource block) that are allocated to PDSCH 1 for the terminal apparatus 2A itself.

Furthermore, the base station apparatus 1A can set resource allocation information included in the first DCI and resource allocation information included in the second DCI, to be different from each other, with the expectation that a frequency diversity gain is acquired. More precisely, the base station apparatus 1A can non-orthogonally multiplex a plurality of terminal apparatuses with a part of the resource. In this case, the terminal apparatus 2A can demodulate PDSCH 1 for the terminal apparatus 2A itself, assuming that a signal (for example, PDSCH 2) for another terminal apparatus is non-orthogonally multiplexed onto one or several of the resource elements (onto a part of the resource block) that are allocated PDSCH 1 for the terminal apparatus 2A itself. With the blind detection, the terminal apparatus 2A, for example, can detect the resource elements (the resource block) onto which the signal that is transmitted to another terminal apparatus is non-orthogonally multiplexed. For example, the terminal apparatus 2A can perform the blind detection through comparison with a power of the Terminal-specific Reference Signal that is multiplexed onto every resource block.

Furthermore, the base station apparatus 1A can include information indicating allocation of a resource of the signal (for example, PDSCH 2) that is transmitted to another terminal apparatus, which is non-orthogonally multiplexed onto PDSCH 1, in the first DCI. In the first DCI, the base station apparatus 1A can include resource allocation information for PDSCH 2, or can include resource allocation information for PDSCH 1 and information indicating whether or not the resource allocation information for PDSCH 2 is shared. Furthermore, the base station apparatus 1A can include information relating to a resource that is non-orthogonally multiplexed, in the first DCI. Based on the information relating to the resource that is non-orthogonally multiplexed, the terminal apparatus 2A cancels or suppresses the interference signal in the resource that is non-orthogonally multiplexed.

Furthermore, the base station apparatus 1A can include information indicating whether or not a power that is allocated to PDSCH 1 is common to resource elements (resource block) that are allocated to PDSCH 1, in the first DCI. Based on the information, the terminal apparatus 2A can blind-detect whether the signal that is transmitted to another terminal apparatus which is non-orthogonally multiplexed onto PDSCH 1 is entirely non-orthogonally multiplexed, or partially non-orthogonally multiplexed, onto PDSCH 1.

Figure 3:
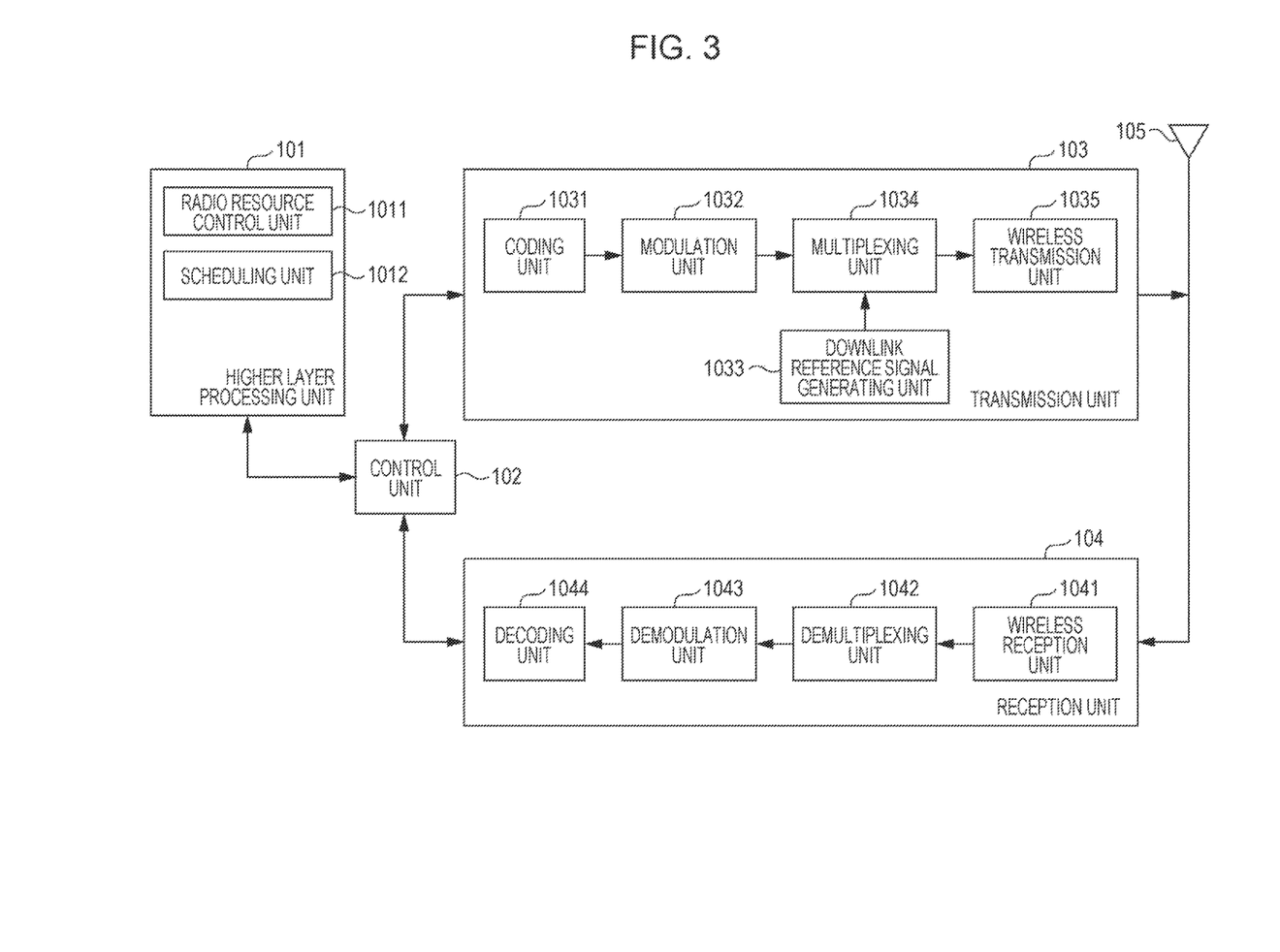
FIG. 3 is a block diagram illustrating an example of a constitution of a base station apparatus according to the present embodiment.

FIG. 3 is a schematic block diagram illustrating a constitution of the base station apparatus 1A according to the present embodiment. As illustrated in FIG. 3, the base station apparatus 1A is constituted to include a higher layer processing unit (a higher layer processing step) 101, a control unit (a control step) 102, a transmission unit (a transmission step) 103, a reception unit (a reception step) 104, and a transmit and receive antenna 105. Furthermore, the higher layer processing unit 101 is constituted to include a radio resource control unit (a radio resource control step) 1011 and a scheduling unit (a scheduling step) 1012. Furthermore, the transmission unit 103 is constituted to include a coding unit (a coding step) 1031, a modulation unit (a modulation step) 1032, a downlink reference signal generating unit (a downlink reference signal generating step) 1033, a multiplexing unit (a multiplexing step) 1034, and a wireless transmission unit (a wireless transmission step) 1035. Furthermore, the reception unit 104 is constituted to include a wireless reception unit (a wireless reception step) 1041, a demultiplexing unit (a demultiplexing step) 1042, a demodulation unit (a demodulation step) 1043, and a decoding unit (a decoding step) 1044.

The higher layer processing unit 101 performs processing of the Medium Access Control (MAC) layer, a Packet Data Convergence Protocol (PDCP) layer, a Radio Link Control (RLC) layer, and the Radio Resource Control (RRC) layer. Furthermore, the higher layer processing unit 101 generates information necessary to perform control of the transmission unit 103 and the reception unit 104, and outputs the generated information to the control unit 102.

The higher layer processing unit 101 receives information relating to the terminal apparatus, such as a function (UE capability) of the terminal apparatus, from the terminal apparatus. In other words, the terminal apparatus transmits the function of the terminal apparatus's own to the base station apparatus using the higher layer signaling.

It is noted that, as will be described below, information relating to the terminal apparatus includes information indicating whether or not the terminal apparatus supports a predetermined function, and information indicating completion of introduction and test of the predetermined function by the terminal apparatus. It is noted that, as will be described below, whether or not the predetermined function is supported includes whether or not the introduction and the test of the predetermined function are completed.

For example, in a case where the terminal apparatus supports the predetermined function, the terminal apparatus transmits the information (a parameter) indicating whether or not the predetermined function is supported. In a case where the terminal apparatus does not support the predetermined function, the terminal apparatus does not transmit the information (the parameter) indicating whether or not the predetermined function is supported. That is, whether or not the predetermined function is supported is notified depending on whether or not the information (the parameter) indicating whether or not the predetermined function is supported is transmitted. It is noted that the information (the parameter) indicating whether or not the predetermined function is supported may be notified using a bit that is 1, that is, a bit that is 0 or a bit that is 1.

The radio resource control unit 1011 generates or acquires from a higher node the downlink data (the Transport Block) that is mapped to the PDSCH for the downlink, the system information, the RRC message, the MAC CE, and the like. The radio resource control unit 1011 outputs the downlink data to the transmission unit 103, and outputs other information to the control unit 102. Furthermore, the radio resource control unit 1011 manages various pieces of configuration information of the terminal apparatus.

The scheduling unit 1012 determines a frequency and a subframe to which the physical channels (the PDSCH and PUSCH) are allocated, coding rates and modulation schemes (or the MCSs) of and for the physical channels (the PDSCH and the PUSCH), a transmit power, and the like. The scheduling unit 1012 outputs the determined information to the control unit 102.

The scheduling unit 1012 generates information that is used for scheduling of the physical channels (the PDSCH and the PUSCH), based on a result of the scheduling. The scheduling unit 1012 outputs the generated information to the control unit 102.

Based on information that is input from the higher layer processing unit 101, the control unit 102 generates a control signal for performing the control of the transmission unit 103 and the reception unit 104. The control unit 102 generates the Downlink Control Information, based on the information that is input from the higher layer processing unit 101, and outputs the generated Downlink Control Information to the transmission unit 103.

The transmission unit 103 generates the Downlink Reference Signal in accordance with the control signal that is input from the control unit 102, codes and modulates the HARQ indicator, the Downlink Control Information, and the downlink data, which are input from the higher layer processing unit 101, multiplexes the PHICH, the PDCCH, the EPDCCH, the PDSCH, and the Downlink Reference Signal, and transmits the resulting signal to the terminal apparatus 2 through the transmit and receive antenna 105.

The coding unit 1031 performs coding on the HARQ indicator, the Downlink Control Information, and the downlink data, which are input from the higher layer processing unit 101. When performing the coding, the coding unit 1031 uses a coding scheme that is determined in advance, such as block coding, convolutional coding, or turbo coding, or uses a coding scheme that is determined by the radio resource control unit 1011. The modulation unit 1032 performs modulation on coding bits that are input from the coding unit 1031, using a modulation scheme that is determined in advance, such as Binary Phase Shift Keying (BPSK), quadrature Phase Shift Keying (QPSK), 16 quadrature amplitude modulation (QAM), 64 QAM, or 256 QAM, or using a modulation scheme that is determined by the radio resource control unit 1011.

The downlink reference signal generating unit 1033 generates as the Downlink Reference Signal a sequence that is already known to the terminal apparatus 2A, which is obtained according to a rule that is determined in advance based on a physical cell identity (PCI) (a cell ID) for identifying the base station apparatus 1A, and the like.

A multiplexing unit 1034 multiplexes a modulation symbol of each channel, which results from the modulation, and the Downlink Reference Signal and the Downlink Control Information, which are generated. More precisely, the multiplexing unit 1034 maps the modulation symbol of each channel, which results from the modulation, and the Downlink Reference Signal and the Downlink Control Information, which are generated, to resource elements.

The wireless transmission unit 1035 performs Inverse Fast Fourier Transform (IFFT) on a modulation symbol and the like that result from the multiplexing, generates an OFDM symbol, attaches a cyclic prefix (CP) to the OFDM symbol, generates a digital signal in a baseband, converts the digital signal in the baseband into an analog signal, cancels superfluous frequency components by perform filtering, performs up-converting into a carrier frequency, performs power amplification, and outputs a final result to the transmit and receive antenna 105 for transmission.

In accordance with the control signal that is input from the control unit 102, the reception unit 104 outputs information, which results from demultiplexing, demodulating, and decoding a reception signal that is received from the terminal apparatus 2A through the transmit and receive antenna 105, to the higher layer processing unit 101.

The wireless reception unit 1041 converts an uplink signal that is received through the transmit and receive antenna 105, into a signal in a baseband by performing down-converting, cancels an unnecessary frequency component, controls an amplification level in such a manner that a signal level is suitably maintained, performs orthogonal demodulation based on an in-phase component and a quadrature component of the received signal, and converts an analog signal that results from the orthogonal demodulation, into a digital signal.

The wireless reception unit 1041 removes a portion that is equivalent to the CP from the digital signal that results from the conversion. The wireless reception unit 1041 performs Fast Fourier Transform (FFT) on the signal from which the CP is removed, extracts a signal in the frequency domain, and outputs the extracted signal to the demultiplexing unit 1042.

The demultiplexing unit 1042 demultiplexes the signal that is input from the wireless reception unit 1041 into the PUCCH, the PUSCH, and the signal such as the Uplink Reference Signal. It is noted that, the demultiplexing is performed based on radio resource allocation information that is determined in advance by the base station apparatus 1A, using the radio resource control unit 1011, and that is included in the uplink grant that is notified to each terminal apparatus 2.

Furthermore, the demultiplexing unit 1042 performs channel compensation on the PUCCH and the PUSCH. Furthermore, the demultiplexing unit 1042 demultiplexes the Uplink Reference Signal.

A demodulation unit 1043 performs Inverse Discrete Fourier Transform (IDFT) on the PUSCH, acquires the modulation symbol, and performs reception signal demodulation on each of the modulation symbols on the PUCCH and the PUSCH, using the modulation scheme that is determined in advance, such as BPSK, QPSK, 16 QAM, 64 QAM, or 256 QAM, or using the modulation scheme that is notified, in advance, with the uplink grant, to each terminal apparatus 2 by the base station apparatus 1A itself.

A decoding unit 1044 performs the decoding on coding bits of the PUCCH and the PUSCH that result from the demodulation, at a coding rate in compliance with the coding scheme that is determined in advance, which is determined in advance, or at a coding rate which is notified in advance with the uplink grant to the terminal apparatus 2 by the base station apparatus 1A itself, and outputs the uplink data and the Uplink Control Information that result from the decoding, to the higher layer processing unit 101. In the case of retransmission of the PUSCH, the decoding unit 1044 performs the decoding using the coding bits that are input from the higher layer processing unit 101 and that are retained in an HARQ buffer, and the coding bits that result from the demodulation.

Figure 4:
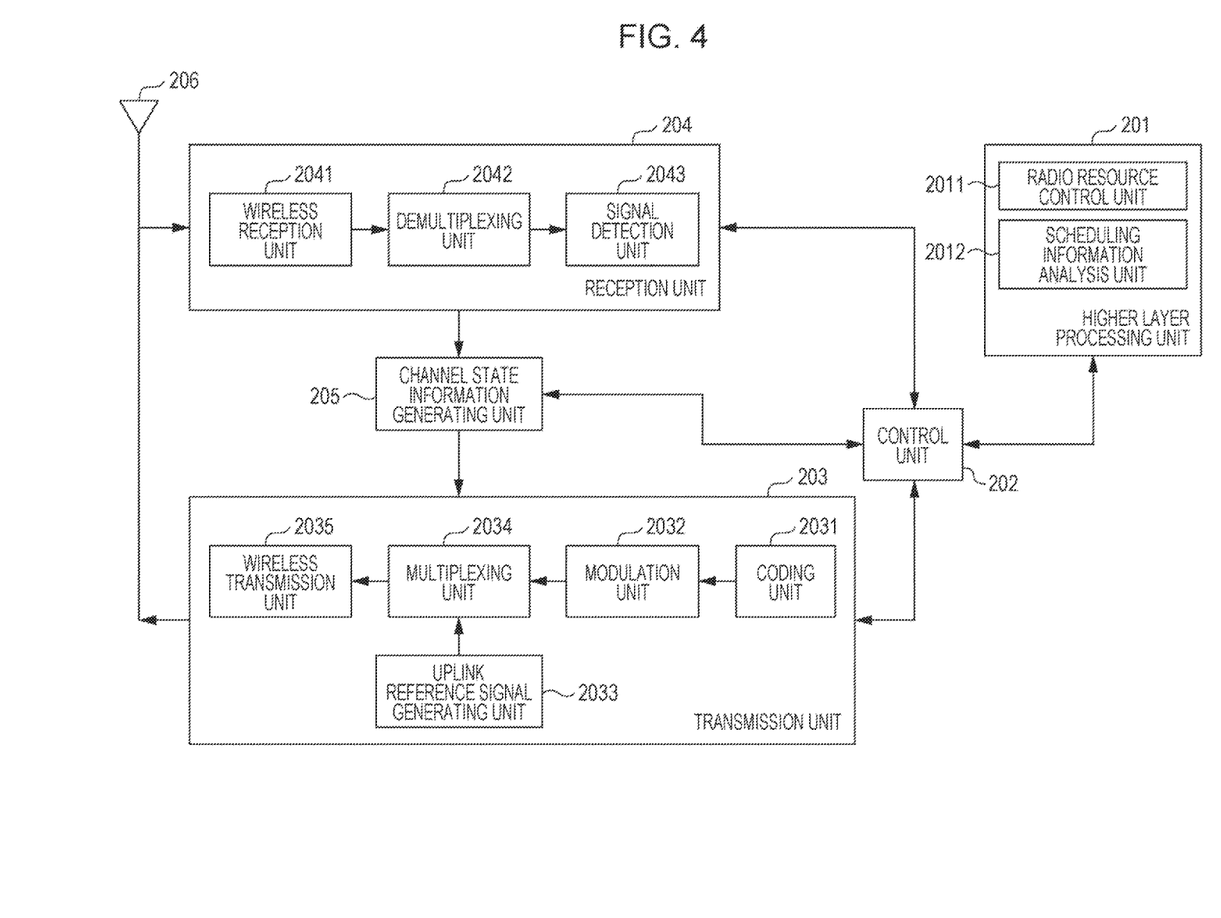
FIG. 4 is a block diagram illustrating an example of a constitution of a terminal apparatus according to the present embodiment.

FIG. 4 is a schematic block diagram illustrating a constitution of the terminal apparatus 2 according to the present embodiment. As illustrated in FIG. 4, the terminal apparatus 2A is constituted to include a higher layer processing unit (a higher layer processing step) 201, a control unit (a control step) 202, a transmission unit (a transmission step) 203, a reception unit (a reception step) 204, a channel state information generating unit (a channel state information generating step) 205, and a transmit and receive antenna 206. Furthermore, the higher layer processing unit 201 is constituted to include a radio resource control unit (a radio resource control step) 2011 and a scheduling information analysis unit (a scheduling information analysis step) 2012. Furthermore, the transmission unit 203 is constituted to include a coding unit (a coding step) 2031, a modulation unit (a modulation step) 2032, an uplink reference signal generating unit (an uplink reference signal generating step) 2033, a multiplexing unit (a multiplexing step) 2034, and a wireless transmission unit (a wireless transmission step) 2035. Furthermore, the reception unit 204 is constituted to include a wireless reception unit (a wireless reception step) 2041, a demultiplexing unit (a demultiplexing step) 2042, and a signal detection unit (a signal detection step) 2043.

The higher layer processing unit 201 outputs the uplink data (the Transport Block) that is generated by a user operation and the like, to the transmission unit 203. Furthermore, the higher layer processing unit 201 performs the processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs information indicating the function of the terminal apparatus, which is supported by the terminal apparatus itself, to the transmission unit 203.

The radio resource control unit 2011 manages various pieces of configuration information of the terminal apparatus 2A itself. Furthermore, the radio resource control unit 2011 generates information that is mapped to each channel in the uplink and outputs the generated information to the transmission unit 203.

The radio resource control unit 2011 acquires configuration information relating to CSI feedback, which is transmitted from the base station apparatus, and outputs the acquired configuration information to the control unit 202.

The scheduling information analysis unit 2012 analyzes the Downlink Control Information that is received through the reception unit 204 and determines scheduling information. Furthermore, the scheduling information analysis unit 2012 generates the control information in order to perform the control of the reception unit 204 and the transmission unit 203 based on the scheduling information, and outputs the generated control information to the control unit 202.

Based on the information that is input from the higher layer processing unit 201, the control unit 202 generates a control signal for performing the control of the reception unit 204, the channel state information generating unit 205, and the transmission unit 203. The control unit 202 outputs the generated control signal to the reception unit 204, the channel state information generating unit 205, and the transmission unit 203 and performs the control of the reception unit 204 and the transmission unit 203.

The control unit 202 controls the transmission unit 203 in such a manner that the CSI which is generated by the channel state information generating unit 205 is transmitted to the base state apparatus.

In accordance with the control signal that is input from the control unit 202, the reception unit 204 outputs information, which results from demultiplexing, demodulating, and decoding a reception signal that is received from the base station apparatus 1A through the transmit and receive antenna 206, to the higher layer processing unit 201.

The wireless reception unit 2041 converts a downlink signal that is received through the transmit and receive antenna 206, into a signal in a baseband by performing down-converting, removes an unnecessary frequency component, controls an amplification level in such a manner that a signal level is suitably maintained, performs orthogonal demodulation based on an in-phase component and a quadrature component of the received signal, and converts an analog signal that results from the orthogonal demodulation, into a digital signal.

Furthermore, the wireless reception unit 2041 removes a portion that is equivalent to the CP from the digital signal that results from the conversion, performs the Fast Fourier Transform on the signal from which the CP is removed, and extracts a signal in the frequency domain.

The demultiplexing unit 2042 demultiplexes a signal that results from the extraction, into the PHICH, the PDCCH, the EPDCCH, the PDSCH, and the Downlink Reference Signal. Furthermore, the demultiplexing unit 2042 performs channel compensation on the PHICH, the PDCCH, and the EPDCCH based on a channel estimate of a desired signal that is acquired from channel measurement, detects the Downlink Control Information, and outputs the detected Downlink Control Information to the control unit 202. Furthermore, the control unit 202 outputs the PDSCH and a channel estimate of the desired signal to the signal detection unit 2043.

The signal detection unit 2043 performs the signal detection using the PDSCH and the channel estimate, and outputs a result of the signal detection to the higher layer processing unit 201.

The transmission unit 203 generates the Uplink Reference Signal in accordance with the control signal, which is input from the control unit 202, performs the coding and the modulation on the uplink data (the Transport Block), which is input from the higher layer processing unit 201, multiplexes the PUCCH, the PUSCH, and the generated Uplink Reference Signal, and transmits a result of the multiplexing to the base station apparatus 1A through the transmit and receive antenna 206.

The coding unit 2031 performs the coding, such as the convolutional coding or the block coding, on the Uplink Control Information that is input from the higher layer processing unit 201. Furthermore, the coding unit 2031 performs the turbo coding, based on information that is used for scheduling of the PUSCH.

The modulation unit 2032 performs the modulation on coding bits, which are input from the coding unit 2031, in compliance with a modulation scheme that is notified with the Downlink Control Information, such as BPSK, QPSK, 16 QAM, or 64 QAM, or in compliance with a modulation scheme that is determined in advance for every channel.

The uplink reference signal generating unit 2033 generates a sequence that is obtained according to a rule (formula) which is determined in advance, based on the physical cell identity (PCI) (which is referred to as the Cell ID or the like) for identifying the base station apparatus 1A, a bandwidth to which the Uplink Reference Signal is mapped, a cyclic shift that is notified with the uplink grant, a parameter value for generation of a DMRS sequence, and the like.

In accordance with the control signal that is input from the control unit 202, the multiplexing unit 2034 re-maps the modulation symbols on the PUSCH in parallel and then performs Discrete Fourier Transform (DFT) on the re-mapped modulation symbols. Furthermore, the multiplexing unit 2034 multiplexes PUCCH and PUSCH signals and the generated Uplink Reference Signal for every transmit antenna port. More precisely, the multiplexing unit 2034 maps the PUCCH and PUSCH signals and the generated Uplink Reference Signal to resource elements for every transmit antenna port.

The wireless transmission unit 2035 performs the Inverse Fast Fourier Transform (IFFT) on a signal that results from the multiplexing, performs modulation in compliance with an SC-FDMA scheme on the resulting signal, generates an SC-FDMA symbol, attaches a CP to the generated SC-FDMA symbol, generates a digital signal in a baseband, converts the digital signal in the baseband into an analog signal, removes superfluous frequency components, performs up-converting into a carrier frequency, performs the power amplification, and outputs a final result to the transmit and receive antenna 206 for transmission.

It is noted that a program running on the base station apparatus and the terminal apparatus according to the present invention is a program (a program for causing a computer to perform functions) that controls a CPU and the like in such a manner as to realize the functions according to the embodiments of the present invention, which are described above. Then, information that is handled in these apparatuses is temporarily accumulated in a RAM while being processed. Thereafter, the information is stored in various ROMs or HDDs, and if need arises, is read by the CPU to be modified or written. Of a semiconductor medium (for example, a ROM, a nonvolatile memory card, or the like), an optical storage medium (for example, a DVD, a MO, a MD, a CD, a BD, or the like), a magnetic recording medium (for example, a magnetic tape, a flexible disk, or the like), and the like, any one may be possible as a recording medium on which to store the program. Furthermore, in some cases, the functions according to the embodiments, which are described above, are realized by executing the loaded program, and in addition, the functions according to the present invention are realized by performing processing in conjunction with an operating system, other application programs, or the like, based on an instruction from the program.

Furthermore, in a case where the programs are distributed on the market, the programs, each of which is stored on a portable recording medium, can be distributed, or can be transferred to a server computer that is connected through a network such as the Internet. In this case, a storage device of the server computer also falls within the scope of the present invention. Furthermore, some or all of the portions of each of the terminal apparatus and the base station apparatus according to the embodiments, which are described above, may be realized as an LSI that is a typical integrated circuit. Each functional block of a reception apparatus may be individually built into a chip, and one or several of, or all of the functional blocks may be integrated into a chip. In a case where each of the functional blocks is integrated into a circuit, an integrated circuit control unit is added that controls the functional blocks.

Furthermore, a technique for the integrated circuit is not limited to the LSI, and an integrated circuit for the functional block may be realized as a dedicated circuit or a general-purpose processor. Furthermore, if, with advances in semiconductor technology, a circuit integration technology for a circuit with which an LSI is replaced will appear, it is also possible that an integrated circuit to which such a technology applies is used.

It is noted that the invention in the present application is not limited to the embodiments described above. Furthermore, application of the terminal apparatus according to the invention in the present application is not limited to a mobile station apparatus. It goes without saying that the terminal apparatus can be applied to a stationary-type electronic apparatus that is installed indoors or outdoors, or a non-movable-type electronic apparatus, for example, an AV apparatus, a kitchen apparatus, a cleaning or washing machine, an air conditioner, office equipment, a vending machine, and other household apparatuses.

The embodiments of the present invention are described in detail above with reference to the drawings, but specific configurations are not limited to the embodiments. A design and the like within the scope not departing from the gist of the present invention also fall within the scope of the claims.

INDUSTRIAL APPLICABILITY

The present invention is suitable for use in a base station apparatus, a terminal apparatus, and a communication method.

It is noted that, the present international application claims the benefits of Japanese Patent Application No. 2015-025902 filed on Feb. 13, 2015, and the entire contents of Japanese Patent Application No. 2015-025902 are incorporated herein by reference.

REFERENCE SIGNS LIST

1A BASE STATION APPARATUS
2A, 2B TERMINAL APPARATUS

101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT
1031 CODING UNIT
1032 MODULATION UNIT
1033 DOWNLINK REFERENCE SIGNAL GENERATING UNIT
1034 MULTIPLEXING UNIT
1035 WIRELESS TRANSMISSION UNIT
1041 WIRELESS RECEPTION UNIT
1042 DEMULTIPLEXING UNIT
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 CHANNEL STATE INFORMATION GENERATING UNIT
206 TRANSMIT AND RECEIVE ANTENNA
2011 RADIO RESOURCE CONTROL UNIT
2012 SCHEDULING INFORMATION ANALYSIS UNIT
2031 CODING UNIT
2032 MODULATION UNIT
2033 UPLINK REFERENCE SIGNAL GENERATING UNIT
2034 MULTIPLEXING UNIT
2035 WIRELESS TRANSMISSION UNIT
2041 WIRELESS RECEPTION UNIT
2042 DEMULTIPLEXING UNIT
2043 SIGNAL DETECTION UNIT

The invention claimed is:

1. A communication method for a terminal apparatus that communicates with a base station apparatus, the communication method comprising the steps of:

receiving, from the base station apparatus, configuration information of a higher layer, and downlink control information and a UE-specific reference signal that have been multiplexed, and a downlink shared channel; and demultiplexing the downlink control information and the UE-specific reference signal that have been multiplexed, wherein in a case where the configuration information of a higher layer includes predetermined configuration information, receiving the downlink control information including information relating to a transmit power for the UE-specific reference signal, wherein the information relating to the transmit power for the UE-specific reference signal is an information indicating a power offset of a transmit power for a predetermined signal with respect to the transmit power for the UE-specific reference signal, and the transmit power for the predetermined signal is a sum of a transmit power for the downlink shared channel and a transmit power for an interference signal.

2. A terminal apparatus that communicates with a base station apparatus, the terminal apparatus comprising:

wireless reception circuitry configured and/or programmed to receive, from the base station apparatus, configuration information of a higher layer, and downlink control information and a UE-specific reference signal that have been multiplexed, and a downlink shared channel; and demultiplexing circuitry configured and/or programmed to demultiplex the downlink control information and the UE-specific reference signal that have been multiplexed, wherein in a case where the configuration information of a higher layer includes predetermined configuration information, receiving the downlink control information including information relating to a transmit power for the UE-specific reference signal, wherein the information relating to the transmit power for the UE-specific reference signal is an information indicating a power offset of a transmit power for a predetermined signal with respect to the transmit power for the UE-specific reference signal, and the transmit power for the predetermined signal is a sum of a transmit power for the downlink shared channel and a transmit power for an interference signal.

3. The terminal apparatus according to claim 2, wherein the downlink shared channel is demodulated using the information indicating the power offset.

* * * * *